(12) United States Patent
Marsousi et al.

(10) Patent No.: US 10,725,438 B1
(45) Date of Patent: Jul. 28, 2020

(54) SYSTEM AND METHOD FOR AUTOMATED WATER OPERATIONS FOR AQUATIC FACILITIES USING IMAGE-BASED MACHINE LEARNING

(71) Applicant: 11114140 Canada Inc., Toronto (CA)

(72) Inventors: Mahdi Marsousi, Toronto (CA); Akshaya Kumar Mishra, Toronto (CA); Amir H Hosseini, Toronto (CA)

(73) Assignee: 11114140 Canada Inc., North York (CA)

( * ) Notice: Subject to any disclaimer, the term of this patent is extended or adjusted under 35 U.S.C. 154(b) by 0 days.

(21) Appl. No.: 16/589,701

(22) Filed: Oct. 1, 2019

(51) Int. Cl.
| | |
|---|---|
| E04H 4/12 | (2006.01) |
| G05B 13/02 | (2006.01) |
| G06N 3/08 | (2006.01) |
| G06N 3/04 | (2006.01) |
| G06K 9/00 | (2006.01) |
| G06K 9/62 | (2006.01) |

(52) U.S. Cl.
CPC ............ *G05B 13/027* (2013.01); *E04H 4/12* (2013.01); *E04H 4/1218* (2013.01); *G06K 9/00362* (2013.01); *G06K 9/6256* (2013.01); *G06N 3/04* (2013.01); *G06N 3/08* (2013.01)

(58) Field of Classification Search
None
See application file for complete search history.

(56) References Cited

U.S. PATENT DOCUMENTS

| | | | | |
|---|---|---|---|---|
| 6,133,838 A | * | 10/2000 | Meniere | ............... G08B 21/082 340/566 |
| 7,839,291 B1 | * | 11/2010 | Richards | ............... G08B 21/086 340/553 |
| 2003/0196261 A1 | * | 10/2003 | Olson | ................... A47K 3/001 4/559 |
| 2004/0036766 A1 | * | 2/2004 | Meniere | ................... G01V 8/10 348/135 |
| 2013/0313204 A1 | * | 11/2013 | Shalon | ................... G01N 33/18 210/744 |
| 2017/0213451 A1 | * | 7/2017 | Potucek | ............... A61H 33/005 |
| 2018/0174207 A1 | * | 6/2018 | Potucek | ................ G06Q 50/08 |

OTHER PUBLICATIONS

English translation of Boivin et al. FR 2978182 A1 published Jan. 25, 2013.*

\* cited by examiner

*Primary Examiner* — Bernard G Lindsay
(74) *Attorney, Agent, or Firm* — Bhole IP Law; Anil Bhole; Marc Lampert

(57) ABSTRACT

There is provided systems and methods for automated water operations for aquatic facilities using at least one image captured of the aquatic facilities. A method includes: receiving an input signal including a detected number of occupants in the water at the aquatic facilities, the number of occupants determined using a trained detection machine learning model, the detection machine learning model receiving the captured image with an associated feature map as input, and outputting a detection of each occupant in the water, the water level machine learning model trained using training images each including a respective label for each occupant in the training image; determining a volume of water to add by multiplying the number of occupants by a predetermined volume of freshwater to add per occupant; and directing one or more water flow regulators to permit inflow of water approximately equivalent to the volume of water to add.

20 Claims, 12 Drawing Sheets

SYSTEM AND METHOD FOR AUTOMATED WATER OPERATIONS FOR AQUATIC FACILITIES USING IMAGE-BASED MACHINE LEARNING

TECHNICAL FIELD

The following relates generally to water management; and more particularly, to systems and methods for automated water operations for aquatic facilities.

BACKGROUND

Aquatics and facilities with swimming pools are among the highest energy and water users in commercial real estate, multi-residential, and municipal buildings. In addition, these facilities are continually challenged to meet environmental regulations and health codes, while reducing operating costs pertinent to water and energy use and staffing. According to health and safety regulations for swimming pools (depending on the jurisdiction), a certain amount of freshwater needs to be added per swimmer.

SUMMARY

In an aspect, there is provided a computer-implemented method for automated water operations for aquatic facilities using at least one image captured of the aquatic facilities, the method comprising: receiving the at least one captured image; receiving an input signal comprising a detected number of occupants in the water at the aquatic facilities, the number of occupants determined using a trained detection machine learning model, the detection machine learning model receiving the captured image with an associated feature map as input, and outputting a detection of each occupant in the water, the water level machine learning model trained using training images each comprising a respective label for each occupant in the training image; determining a volume of water to add by multiplying the number of occupants by a predetermined volume of freshwater to add per occupant; and directing one or more water flow regulators to permit inflow of water approximately equivalent to the volume of water to add.

In a particular case of the method, the method further comprising receiving another input signal comprising a water level estimation.

In another case of the method, the water level is estimated using a trained water level machine learning model, the water level machine learning model receiving the captured image as input, the captured image comprising a floating object indicative of the water level, the water level machine learning model outputting the water level based on detection of the vertical position of the floating object, the water level machine learning model trained using training images each comprising the floating object and a respective label for water level.

In yet another case of the method, the method further comprising determining an overall maximum volume of water that can be added and determining an overall minimum volume of water to be added, the overall minimum volume of water to add is determined using the difference between the water level before the addition of any water and a minimum permitted water level multiplied by the area of the water, the overall maximum volume of water to add is determined using the difference between the water level before the addition of any water and a maximum permitted water level multiplied by the area of the water.

In yet another case of the method, where the volume of water to add is less than the overall minimum volume of water to add, the volume of water to add is made equal to the overall minimum volume of water to add.

In yet another case of the method, the method further comprising determining a volume of water to drain when the volume of water to add is greater than the overall maximum volume of water to add, the volume of water to drain is determined as a difference between the volume of water to add and the overall maximum volume of water to add, and directing the one or more water flow regulators to permit outflow of water approximately equivalent to the volume of water to drain.

In yet another case of the method, the method further comprising: receiving a further input signal comprising an estimated turbidity of the water; and where the turbidity is greater than a predetermined turbidity threshold, performing: directing the one or more water flow regulators to permit outflow of water approximately equivalent to a turbidity volume of water; and directing the one or more water flow regulators to permit inflow of freshwater approximately equivalent to the turbidity volume of water.

In yet another case of the method, the turbidity of the water is estimated using a trained turbidity machine learning model, the trained turbidity machine learning model receiving the captured image as input, the captured image comprising a turbidity indicator submerged in the water, the trained turbidity machine learning model outputting the turbidity of the water based on an image clarity of the turbidity indicator in the captured image indicative of the turbidity of the water, the turbidity machine learning model trained using training images each comprising the turbidity indicator and a respective label for turbidity.

In yet another case of the method, the associated feature map is localized and classified using a region proposal network.

In yet another case of the method, semi-supervised background subtraction is performed to remove areas not capturing water from the captured image that is inputted to the trained detection machine learning model.

In another aspect, there is provided a system for automated water operations for aquatic facilities using at least one image captured by one or more cameras of the aquatic facilities, the system in communication with one or more water flow regulators, the system comprising one or more processors and a data storage, the one or more processors configured to execute: an input module to receive the at least one captured image from the one or more cameras; a water control module to: receive an input signal comprising a detected number of occupants in the water at the aquatic facilities, the number of occupants determined using a trained detection machine learning model, the detection machine learning model receiving the captured image with an associated feature map as input, and outputting a detection of each occupant in the water, the water level machine learning model trained using training images each comprising a respective label for each occupant in the training image; and determine a volume of water to add by multiplying the number of occupants by a predetermined volume of freshwater to add per occupant; and a device interface to direct the one or more water flow regulators to permit inflow of water approximately equivalent to the volume of water to add.

In a particular case of the system, the input module further receives another input signal comprising a water level estimation.

In another case of the system, the water level is estimated using a trained water level machine learning model, the water level machine learning model receiving the captured image as input, the captured image comprising a floating object indicative of the water level, the water level machine learning model outputting the water level based on detection of the vertical position of the floating object, the water level machine learning model trained using training images each comprising the floating object and a respective label for water level.

In yet another case of the system, the water control module further determines an overall maximum volume of water that can be added and determining an overall minimum volume of water to be added, the overall minimum volume of water to add is determined using the difference between the water level before the addition of any water and a minimum permitted water level multiplied by the area of the water, the overall maximum volume of water to add is determined using the difference between the water level before the addition of any water and a maximum permitted water level multiplied by the area of the water.

In yet another case of the system, where the volume of water to add is less than the overall minimum volume of water to add, the volume of water to add is made equal to the overall minimum volume of water to add.

In yet another case of the system, the water control module further determines a volume of water to drain when the volume of water to add is greater than the overall maximum volume of water to add, the volume of water to drain is determined as a difference between the volume of water to add and the overall maximum volume of water to add, and wherein the device interface directs the one or more water flow regulators to permit outflow of water approximately equivalent to the volume of water to drain.

In yet another case of the system, the input module further receives a further input signal comprising an estimated turbidity of the water, and where the turbidity is greater than a predetermined turbidity threshold, the device interface directs the one or more water flow regulators to permit outflow of water approximately equivalent to a turbidity volume of water, and the device interface directs the one or more water flow regulators to permit inflow of freshwater approximately equivalent to the turbidity volume of water.

In yet another case of the system, the turbidity of the water is estimated using a trained turbidity machine learning model, the trained turbidity machine learning model receiving the captured image as input, the captured image comprising a turbidity indicator submerged in the water, the trained turbidity machine learning model outputting the turbidity of the water based on an image clarity of the turbidity indicator in the captured image indicative of the turbidity of the water, the turbidity machine learning model trained using training images each comprising the turbidity indicator and a respective label for turbidity.

In yet another case of the system, the associated feature map is localized and classified using a region proposal network.

In yet another case of the system, semi-supervised background subtraction is performed to remove areas not capturing water from the captured image that is inputted to the trained detection machine learning model.

These and other aspects are contemplated and described herein. It will be appreciated that the foregoing summary sets out representative aspects of the system and method to assist skilled readers in understanding the following detailed description.

BRIEF DESCRIPTION OF THE DRAWINGS

A greater understanding of the embodiments will be had with reference to the figures, in which.

DETAILED DESCRIPTION

Figure 1:
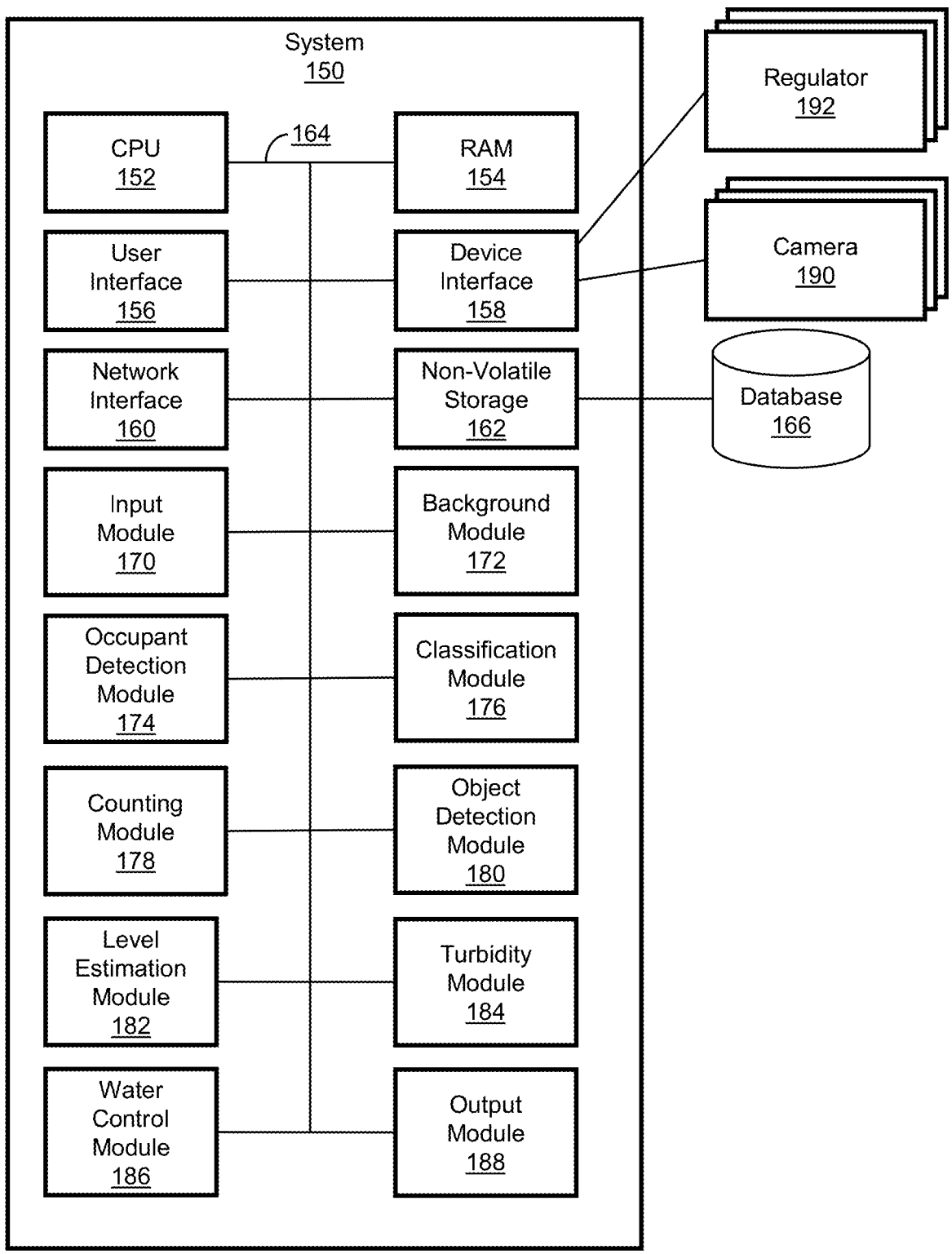
FIG. 1 illustrates a block diagram of a system for automated water operations for aquatic facilities, according to an embodiment.

Embodiments will now be described with reference to the figures. For simplicity and clarity of illustration, where considered appropriate, reference numerals may be repeated among the Figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures, and components have not been described in detail so as not to obscure the embodiments described herein. Also, the description is not to be considered as limiting the scope of the embodiments described herein.

Various terms used throughout the present description may be read and understood as follows, unless the context indicates otherwise: "or" as used throughout is inclusive, as though written "and/or"; singular articles and pronouns as used throughout include their plural forms, and vice versa; similarly, gendered pronouns include their counterpart pronouns so that pronouns should not be understood as limiting anything described herein to use, implementation, performance, etc. by a single gender; "exemplary" should be understood as "illustrative" or "exemplifying" and not necessarily as "preferred" over other embodiments. Further definitions for terms may be set out herein; these may apply to prior and subsequent instances of those terms, as will be understood from a reading of the present description.

Any module, unit, component, server, computer, terminal, engine, or device exemplified herein that executes instructions may include or otherwise have access to computer-readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer-readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information, and which can be accessed by an application, module, or both. Any such computer storage media may be part of the device or accessible or connectable thereto. Further, unless the context clearly indicates otherwise, any processor or controller set out herein may be implemented as a singular processor or as a plurality of processors. The plurality of processors may be arrayed or distributed, and any processing function referred to herein may be carried out by one or by a plurality of processors, even though a single processor may be exemplified. Any method, application, or module herein described may be implemented using computer readable/executable instructions that may be stored or otherwise held by such computer-readable media and executed by the one or more processors.

While the present embodiments may refer to a swimming pool, it is understood that this can refer to any suitable controlled aquatic facilities; for example, a wading pool, a man-made pond or lake, a lazy river, a splash pad, waterpark attractions, and the like.

Due to various applicable health and safety regulations for swimming pools, dependant on the jurisdiction, a certain amount of freshwater needs to be added per swimmer. In an example, 15 liters of fresh water must be added per swimmer. In practice, it is nearly impossible to keep track of the number of swimmers. Therefore, it is substantially difficult for operators to manage freshwater usage and comply with the health regulations. Generally, approaches to freshwater management are dependent on operators and their habits. This approach is extremely unreliable, ineffective, potentially costly, and an inefficient use of operators' time.

The following are some examples of how operators generally control freshwater:
  running a constant stream of freshwater in and out during hours of operation;
  adding water to the swimming pool based on a peak number of swimmers sampled randomly; and/or
  draining and filling a fixed volume of water multiple times a day without consideration of the number of swimmers.

None of the above strategies actually control the addition of freshwater based on the actual number of swimmers. As a result, either water is added less than the required amount, or overused. In most cases, freshwater is added much more than what regulations mandates, especially during regular operation (non-peak) days, resulting in a huge volume of water and energy waste. Unnecessary waste of water not only matters to the swimming pools themselves, but also it is a serious concern to societies and municipalities, especially for regions facing drought. Additionally, none of these strategies guarantee that enough water is added to the swimming pool, as the peak number of swimmers can change based on many different contexts.

Embodiments of the present disclosure address the substantial technical challenges in the art by, at least, providing (a) automated real-time occupancy monitoring in swimming pools, (b) automated measurement of water level, (c) automated measurement of turbidity level, and (d) automated control of freshwater in and out of the swimming pool. In some cases, a camera (for example, a security camera) can be used to receive images to be processed by the system. In some cases, the system can also control two electrical valves to control streams of water in and out of the swimming pool. In an embodiment, the system can keep track of the number of swimmers, the water level, and the turbidity in any desired period of time.

Advantageously, embodiments of the present disclosure can replace the tedious and inefficient water management approaches currently used for swimming pools in an automated manner that is impossible to replicate by previous manual approaches. Embodiments of the present disclosure can ensure a near optimal use of freshwater in swimming pools, while complying with health and safety codes. Advantageously, embodiments of the present disclosure can minimize water and energy consumption, ensure compliance with health codes, and maximize pleasure and comfort of swimmers.

Turning to FIG. 1, a system for automated water operations for aquatic facilities 150 is shown, according to an embodiment. In this embodiment, the system 150 is run on a local computing device (for example, a personal computer). In further embodiments, the system 150 can be run on any other computing device; for example, a server, a dedicated piece of hardware, a tablet computer, a smartphone, a microprocessor, or the like. In some embodiments, the components of the system 150 are stored by and executed on a single computing device. In other embodiments, the components of the system 150 are distributed among two or more computer systems that may be locally or remotely distributed; for example, using cloud-computing resources.

FIG. 1 shows various physical and logical components of an embodiment of the system 150. As shown, the system 150 has a number of physical and logical components, including a central processing unit ("CPU") 152 (comprising one or more processors), random access memory ("RAM") 154, a user interface 156, a device interface 158, a network interface 160, non-volatile storage 162, and a local bus 164 enabling CPU 152 to communicate with the other components. CPU 152 executes an operating system, and various modules, as described below in greater detail. RAM 154 provides relatively responsive volatile storage to CPU 152. The user interface 156 enables an administrator or user to provide input via an input device, for example a mouse or a touchscreen. The user interface 156 can also output information to output devices, such as a display or speakers. In some cases, the user interface 156 can have the input device and the output device be the same device (for example, via a touchscreen). The device interface 158 can communicate with one or more cameras 190, for example a networked camera, to capture images of the aquatic facilities. In an example, the cameras 190 can range from 2 mega-pixels to 6 mega-pixels. The device interface 158 can also be used to direct one or more regulators 192; for example, solenoid valves. In some cases, the communication with the one or more cameras 190 and the one or more regulators 192 can be via a network relay board, for example in communication with the network interface 160. In further embodiments, the device interface 158 can retrieve already captured images from the local database 166 or a remote database via the network interface 160. The network interface 160 permits communication with other systems, such as other computing devices and servers remotely located from the system 150, such as for cloud-computing operations. The network communication can be over, for example, an ethernet connection, a local-area-network (LAN), a wide-area-network (WAN), a mobile network, the Internet, or the like. Non-volatile storage 162 stores the operating system and programs, including computer-executable instructions for implementing the operating system and modules, as well as any data used by these services. Additional stored data can be stored in a database 166. During operation of the system 150, the operating system, the modules, and the related data may be retrieved from the non-volatile storage 162 and placed in RAM 154 to facilitate execution.

In some cases, the one or more cameras 190 can be video cameras capturing a sequence of images. In an example, the one or more cameras 190 can be wide-angle cameras. In an example, the one or more cameras 190 can be installed inside a natatorium housing a swimming pool; such that the entirety of the swimming pool is visible within the camera image. In an example implementation, to define a minimum resolution of the one or more cameras 190, a person standing at the farthest distance from the camera inside the swimming pool should occupy at least 400 pixels.

In an example, the network relay board can be installed inside mechanical rooms of swimming pools. In an example embodiment, the device interface 158 can control at least two output relays to command two normally closed solenoid valves (as the regulators 192); including a valve to open and close input fresh water into the swimming pool, and a valve to open and close draining water out of the swimming pool. In some cases, the relays can provide at least two digital inputs to receive feedback from the actual status of the valves 192.

In an embodiment, the system 150 further includes a number of conceptual modules can be executed on the one or more processors 152, including an input module 170, a background module 172, a occupant detection module 174, a classification module 176, a counting module 178, an object detection module 180, a level estimation module 182, a turbidity module 184, a water control module 186, and an output module 188. In some cases, the functions of the modules may be performed on other modules, combined with other modules, or performed on remote systems.

Embodiments of the present disclosure provide occupancy monitoring in swimming pools to address the substantial challenges required by various regulations to add necessary volumes of water per swimmer. Additionally, statistics of patrons of the swimming pool can advantageously be used for analytics purposes; for example, to plan for better quality of service while reducing maintenance costs. In an embodiment, machine learning techniques can be used to detect occupancy of the swimming pool.

Determining occupancy of aquatic facilities is a significant technical challenge. Aquatic facilities can be part of, for example, a fitness club, hotels, or condominium building. For these cases, counting the number of swimmers by a sensor at their arrival is not applicable because there is no control gate at the entrance.

Figure 2:
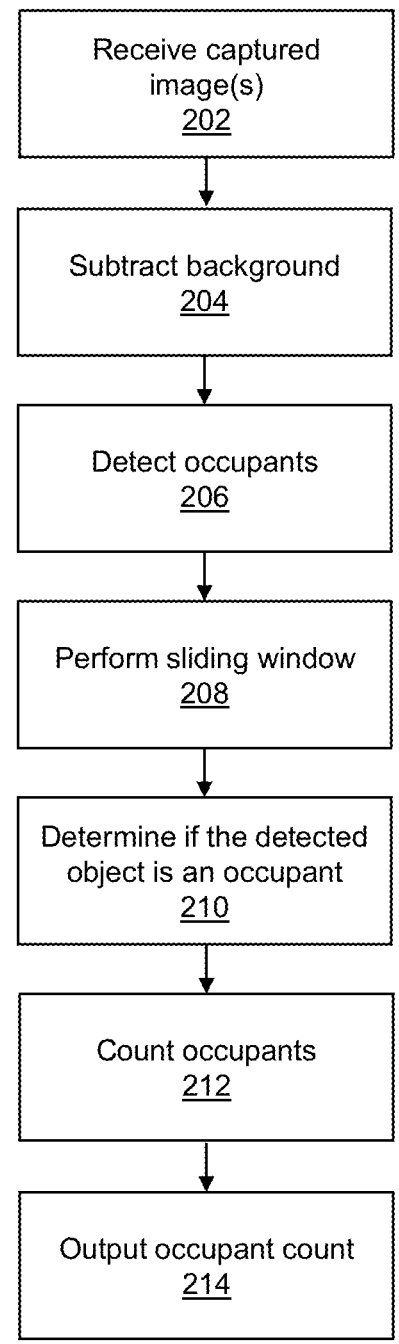
FIG. 2 illustrates a flow diagram of a method for automated water operations for aquatic facilities, according to an embodiment.

FIG. 2 illustrates a method for automated occupancy monitoring of aquatic facilities 200, in accordance with an embodiment.

At block 202, the input module 170 receives one or more captured images from the one or more cameras 170. The one or more captured images each capturing at least a portion of the aquatic facilities; such that the combination of the captured images covers approximately the totality of the aquatic facilities. In some cases, being the same captured images of method 300 and/or method 400.

In some cases, at block 204, the background module 172 can use a semi-supervised background subtraction approach to define a region of interest (ROI) of the aquatic facilities; for example, define the perimeter of a swimming pool. In these cases, the trained detection machine learning model, described herein, can be applied only to the area of the images within the ROI in order to predict occupant location and occupant class in each frame of the captured video.

In some cases, background subtraction, performed by the background module 172, can separate out occupants (foregrounds) elements from the background by generating a foreground mask. Particularly, by detecting dynamically moving objects from static cameras. An example of background subtraction is using a running average as a function to separate foreground from background. In this example, a sequence of captured images is analyzed over a particular set of frames. During this sequence of frames, a running average over a current frame and previous frames is determined. This running average provides a background model, and any new occupant introduced in the sequence becomes part of the foreground. The current frame holds the newly introduced occupant with the background. The background module 172 determines an absolute difference between the background model (which is a function of time) and the current frame (which includes the newly introduced object). The running average is determined using, for example, the following equation:

$$BG(x,y)=(1-\text{alpha})BG(x,y)+\text{alpha}*CF(x,y)$$

$$FG(x,y)=CF(x,y)-BG(x,y)$$

where BG=Background model; CF=current frame, alpha=a selected parameter; and FG=Foreground.

At block 206, the occupant detection module 174 detects each occupant of the aquatic facilities using a detection machine learning model. In an embodiment, the detection machine learning model can comprise a trained convolutional neural network (CNN). In some cases, the occupant detection module 174 can use a region proposal network (RPN) to localize and classify the occupants. In some cases, the RPN can comprise a ResNet-50 architecture to extract occupant specific features and a smaller fully connected network (FCN) to localize and classify the occupant. Generally, ResNet-50 generates a multi-resolution feature map by employing skip-connection. The skip connection can advantageously mitigate the problem of vanishing gradient by allowing an alternate shortcut path gradient to flow through. Further, the skip connection can allow the model to learn an identity function which ensures that a higher layer will perform at least as well as a lower layer.

In further cases, the detection machine learning model can comprise any suitable machine learning model; for example, a random forest model, support vector machines, multi-layer perceptron, and the like. In the present embodiment, ResNet 50 was used for feature extraction because ResNet-50 provides features at multiple scales and helps reduce diminishing gradient issues. Additionally, ResNet-50 has a deep network structure that accelerates training of parameters belonging to first layers, and helps the CNN to learn wealthier filters for feature extraction. During experimental validation and testing performed by the present inventors, it was shown that ResNet-50 had superior performance when compared to other deep convolutional layers.

Figure 9:
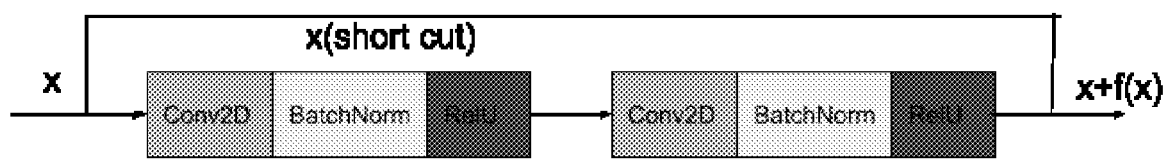
FIG. 9 illustrates an example diagram of a single block of a convolutional neural network (CNN), in accordance with the system of FIG. 1.

FIG. 9 illustrates an example diagram of a single block of the CNN. Input to the CNN is passed through a set of convolutional, batch normalization, and rectified linear unit (ReLU) layers. The output of the CNN is a combination of the transformed input and the original input connected via skip connection. This example block can act as a medium to map occupants into a feature space, where the feature space is a suitable medium for the CNN to determine occupants. The skip connection helps in passing features from low labels features from a lower layer to a higher layer of the network.

Figure 10:
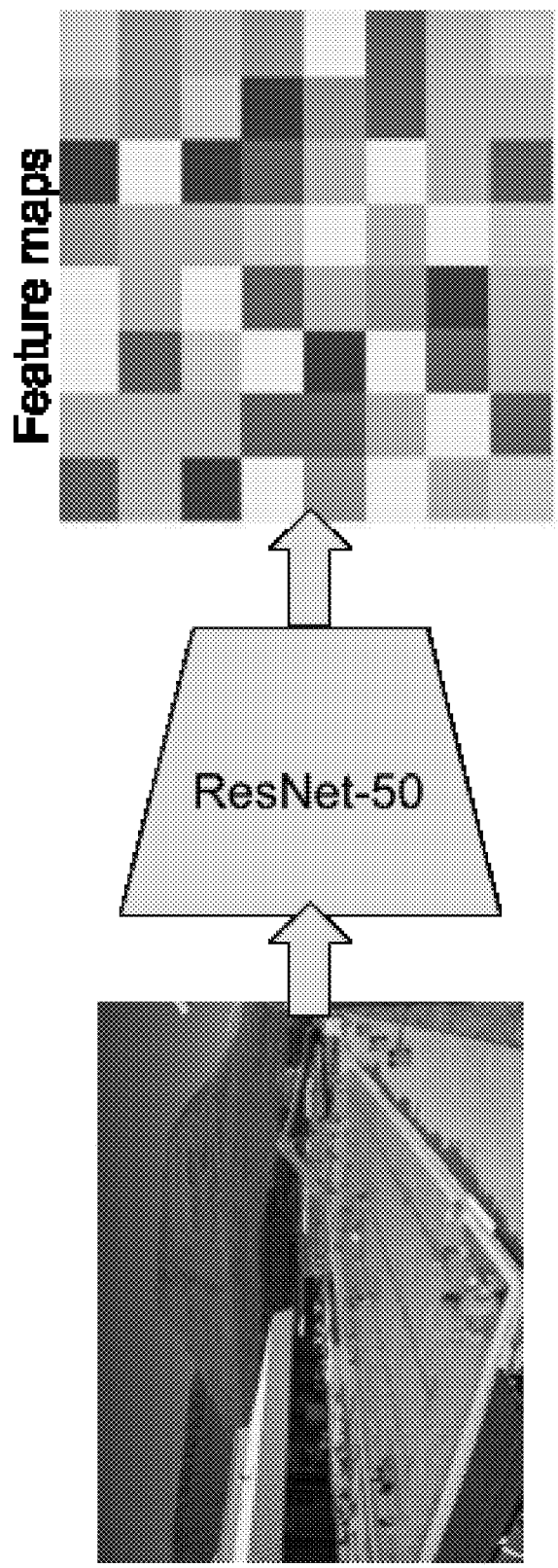
FIG. 10 illustrates an example diagram of a detection machine learning model using a ResNet-50 style CNN, in accordance with the system of FIG. 1.

FIG. 10 illustrates an example diagram of the detection machine learning model using a ResNet-50 style CNN to map an input image into multi-resolution feature maps. In some cases, for computational efficiency, the spatial resolution of the feature map can be reduced by a factor of two in the horizontal and vertical directions. Multi-resolution feature maps can be used to describe objects at various scales. In an example, at a high scale, such as from a distance, an overall shape of the occupant is determined. At a medium scale, such as at a medium distance, the occupant's hands, mouth, and nose can be determined. At high scale, such as at a short distance, skin texture and other fine details of the occupant can be determined. Multi-resolution features can be used to improve detection accuracy and to discriminate occupants from each other.

Figure 12:
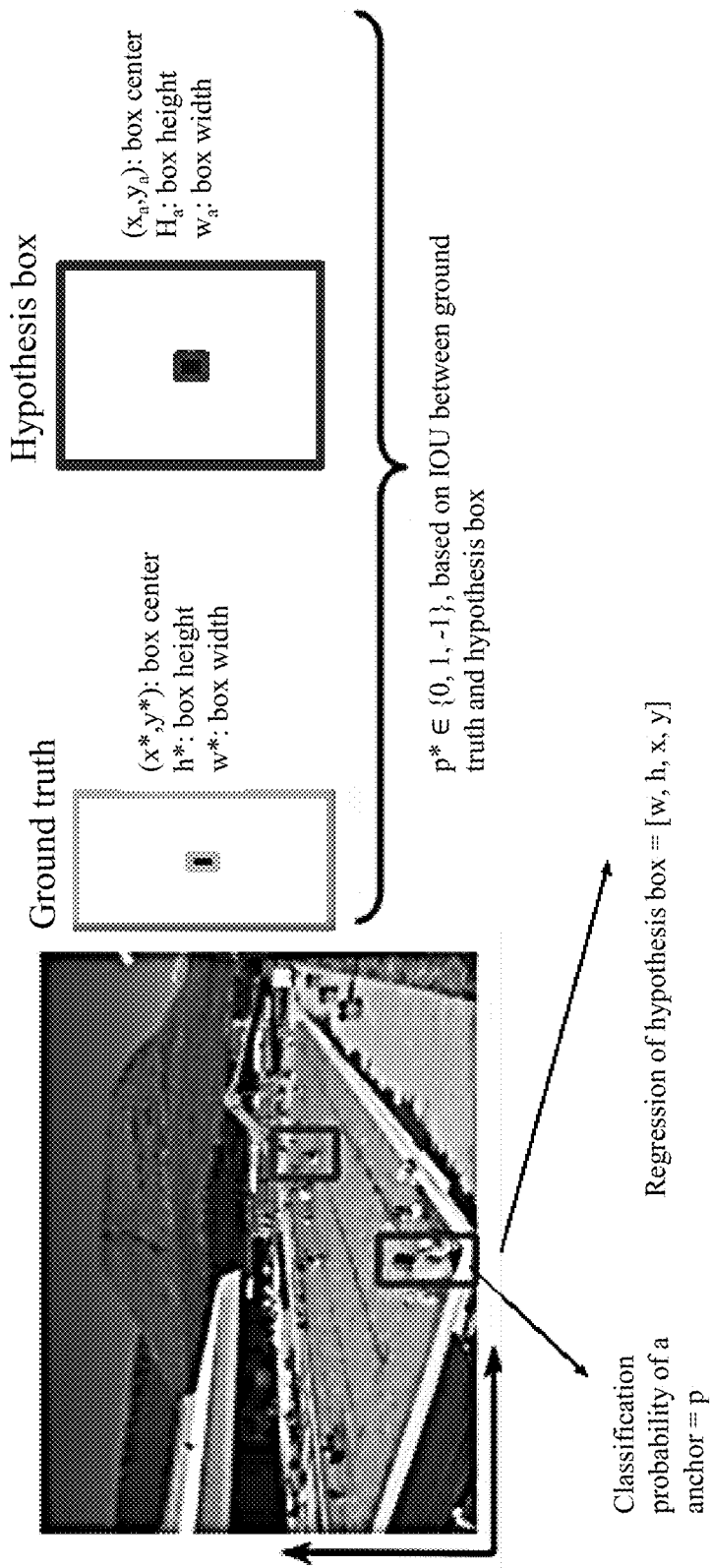
FIG. 12 illustrates a diagram of an example of parameters used in a loss function equation for a region proposal network (RPN), in accordance with the system of FIG. 1.

FIG. 12 illustrates a diagram of an example of parameters used in the loss function, as described herein, for the RPN. Each pixel of the captured image can be examined for the presence of an occupant. Let k be equal to an intersection over union (IOU) of an anchor box at pixel i with a ground truth (i.e., the regression cost), and let p be equal to a classification probability (i.e., the classification cost). If p=1 it indicates the presence of an occupant. If k>0.7 and p=−1 it indicates that there is no occupant present. If k<0.3 and p=0, it indicates that it should not be included in the cost function. In some cases, the classification cost and regression costs can be added together using weight factors $w_{ds}$ and $w_{reg}$.

Figure 11:
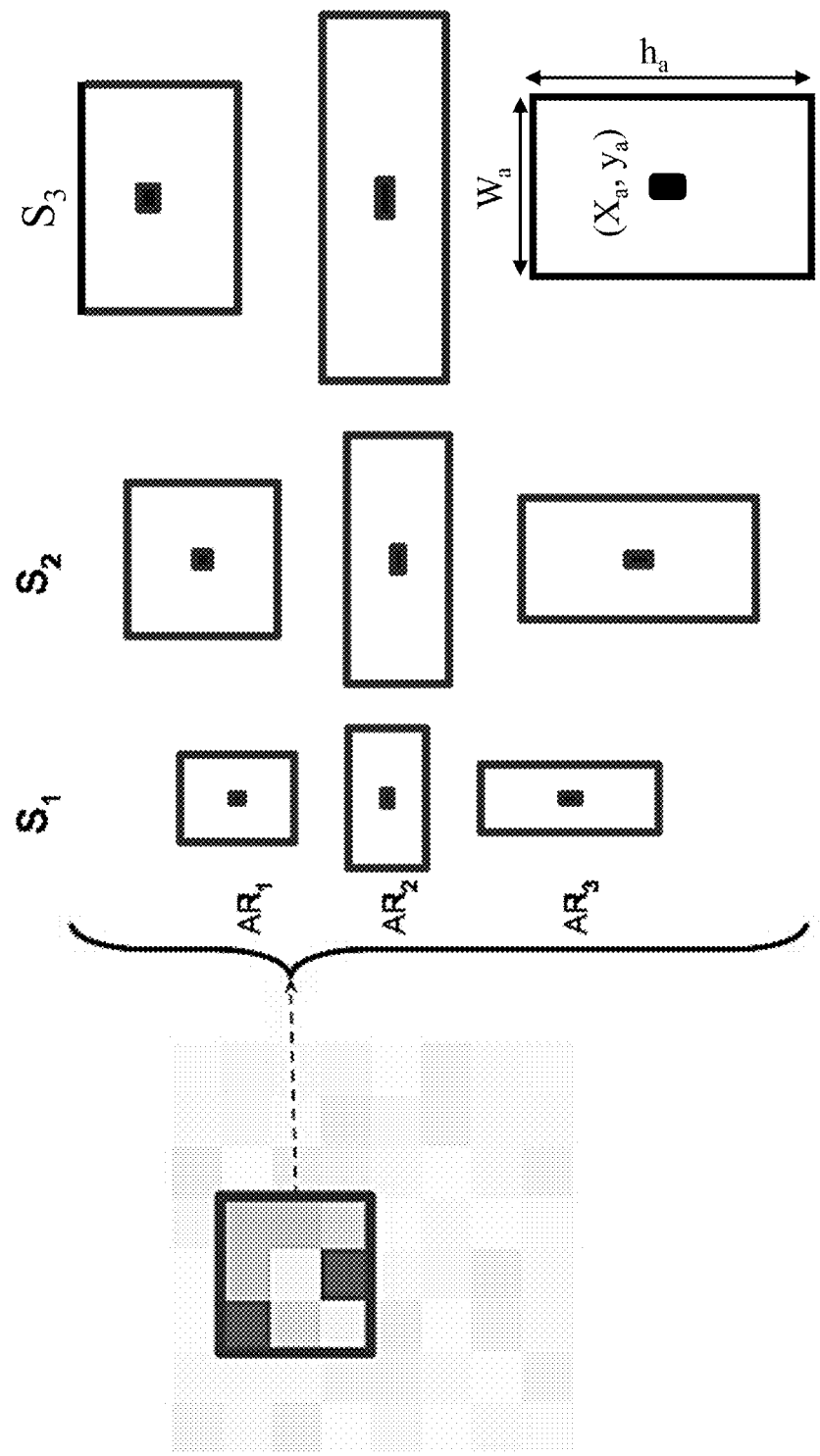
FIG. 11 illustrates an example diagram of an anchor generation approach, in accordance with the system of FIG. 1.

At block 208, in some cases, the occupant detection module 174 can use a sliding window, to run spatially on the multi-resolution ResNet feature maps, to allow detection of candidate occupants throughout a region of interest in the captured image. The size of the sliding window is n×n (in an example, 3×3). In the 3×3 example, for each sliding window, a set of 9 anchors are generated which all have the same center $(x_a, y_a)$ but with 3 different aspect ratios and 3 different scales; where these coordinates are determined with respect to the captured image. FIG. 11 illustrates an example diagram of the anchor generation approach. In the example, 9 anchors are generated at 3 aspect ratios and at 3 scales. In this example, at every pixel location of the captured image, 9 hypotheses of whether an occupant is present can be generated.

At block 210, the classification module 176 can feed the spatial features extracted from the convolutional feature maps (in the above example, 3×3 spatial features) to localization and classification layers of the detection machine learning model. The detection machine learning model is trained to estimate the location of bounding boxes with regards to candidate occupants. In some cases, the localization and classification layers can be part of a smaller artificial neural network. In some cases, the localization (determination of the bounding boxes) can be by a regression-type sub network of the detection machine learning model. In these cases, the output of the regressor determines a predicted bounding-box (having parameters (x,y) as the box center, (w) as the box height, and (h) as the box height). This bounding box can be fed to the classification layers that output a probability, p, indicating whether the predicted box contains an occupant (1) or it is of the background (0 for no occupant present).

In some cases, the training data for the detection machine learning model can include a set of training images. The training images capture one or more occupants using aquatic facilities. The training images can be collected using a semi-supervised annotation tool. In an example training approach, a few frames are captured and a number of swimmers are labelled (for example, 100 swimmers). These labelled frames can be used to train the detection machine learning model (referred to as "model,"). The detection machine learning model is then used to label unknown image frames; such frames are not part of the originally labelled image frames. The frames that are labelled using the detection machine learning model are manually examined; where wrong labels are corrected. These frames with the corrected labels are used to train the detection machine learning model (referred to as "model$_2$"). In some cases, the training of the detection machine learning model can use an incremental learning approach.

In some cases, the loss function used to train the detection machine learning model can include two components: a classification loss ($L_{cls}$) and a regression loss ($L_{reg}$). The classification loss is expressed as the $L_1$ norm between ground truth labels and the estimated labels. The regression label is expressed as the $L_1$ norm between ground truth coordinates and the estimated coordinates.

$$i = \left[\frac{x - x_a}{w_a}, \frac{y - y_a}{h_a}, \log\left(\frac{w}{w_a}\right), \log\left(\frac{h}{h_a}\right)\right],$$

$$t^* = \left[\frac{x^* - x_a}{w_a}, \frac{y^* - y_a}{h_a}, \log\left(\frac{w^*}{w_a}\right), \log\left(\frac{h^*}{h_a}\right)\right]$$

Loss function $L(\{p_i\}, \{t_i\}) = w_{cls}L_{cls}(p_i, p_i^*) + w_{reg}L_{reg}(t_i, t_i^*)$ where t=predicted, t*=ground truth, the following are variables for the anchor bounding box: [xa, ya, wa, ha: anchor center_x, center_y, windth and height], and the following are variables for a predicted bounding box: [x*, y*, w*, h*: predicted center_x, center_y, width and height].

In some cases, the trained detection machine learning model can be compressed using an iterative node pruning approach. The pruning approach iteratively kills low activation nodes by, for a given iteration, training the network and testing using known data. The nodes that do not participate in making a correct decision are pruned. This pruning can be repeated until a desired number of nodes are achieved. Using this pruning approach, the size of the network can be reduced by at least two orders of magnitudes.

In some cases, the output of the detection machine learning model can be a list of detected occupants specified with both a bounding box and a segmentation mask. While the bounding box specifies where the occupant is located, the segmentation mask outlines the detected occupant from its background. The segmentation mask generated using deep instance segmentation can increase detection sensitivity because many times smaller occupants are positioned around a bigger occupant in the image, and detection without segmentation mask (such as single shot detection or Yolo) may fail to properly separate those smaller occupants behind the bigger occupant in the image. To test and validate the detection machine learning model, the output can be compared with a testing dataset in which bounding boxes are manually drawn.

At block 212, the counting module 178 counts each occupant detected and classified in a particular frame. In some cases, the counting module 178 can feed each detected occupant to a non maximal suppression (NMS) algorithm. In an example, the NMS algorithm involves:

The detected occupants in a frame are sorted based upon a detection confidence score outputted by the classification layers of the detection machine learning model.

The detected occupant with the highest confidence score is selected, marked as visited, and added to an occupant count.

Other non-visited detected occupants in the frame are compared with the selected occupant using their mask intersection over mask union metrics (mIOU). During training, the detection machine learning model can learn the confidence score based upon mIOU outputs. Those non-visited occupants whose mIOU with the selected occupant are greater than, for example, 0.85 are merged with the selected occupant and marked as visited.

Another non-visited occupant with highest confidence is selected, and the above steps are repeated, until all occupants are marked as visited and counted.

In some cases, the occupants are detected at each frame individually, as described above, and associated over time; for example, using a combination of a siamese network, a multi-tracking Kalman filter, and a Munkers assignment algorithm. In this way, the occupants can be localized at each frame and counted as a function of time. In further cases, other suitable approaches for multi-target tracking can be used; for example, Markov Chain Monte Carlo can be used, however, it can be very expensive for real time applications.

At block 214, the occupant count is outputted by the output module 188; for example, to the database 166, to other modules, to the user interface 156, or to the network interface 160.

In an experimental example, the present inventors have collected around two hundred images of swimming pools, which includes approximately 5000 swimmers. The training dataset was compiled by manually specifying a bounding box around each swimmer. 4000 captured swimmers were used for training purposes, and the other swimmers were used for testing. The detection machine learning model was determined to have better than 85% accuracy.

Figure 7:
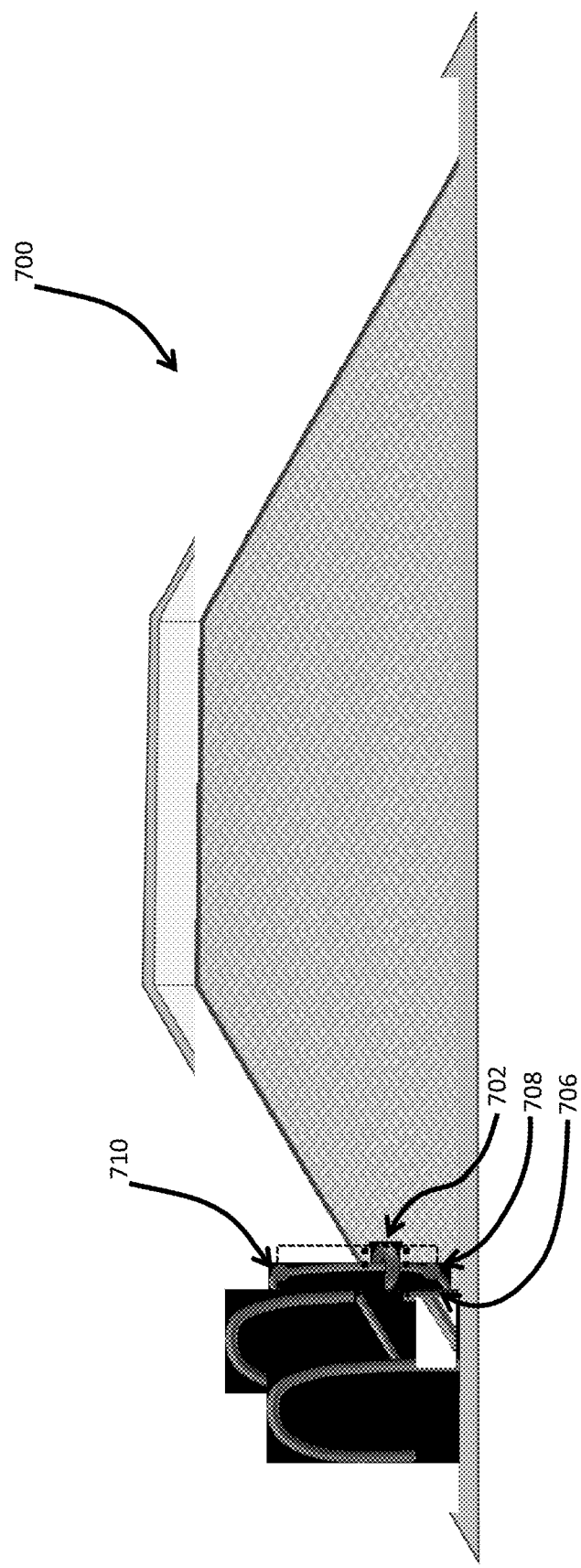
FIG. 7 illustrates an example of a swimming pool having a floating object for measuring the height level of the water, in accordance with the system of FIG. 1.

As another aspect of the present disclosure, water level can be estimated using images captured by the one or more cameras. In an embodiment, the aquatic facilities include a floating object in the water. The floating object is able to move up or down vertically. In an example, a plastic donut can be placed within a rail, attached to a wall of a swimming pool, that only permits movement along the vertical axis (the axis of the height of the water). In this example, the floating object is regulated to only move up and down by having the floating object have a hole through it, with a rail (e.g., tower rail) placed through its center hole. The rail can be fixed to any position in the water that is not moving; for example, a side wall. FIG. 7 illustrates an example of a swimming pool 700 having a floating object 702 (in this example, a donut around a rail) for measuring the height level of the water. Shown in the region of interest 706 of the captured image from the camera, and the endpoints corresponding to a minimum level of water 708 and a maximum level of water 710.

In most cases, the color of the floating object should be different than the color of the wall, floor, and water (light blue). Distinguishing colors are preferable; for example, green, orange, and purple.

Figure 3:
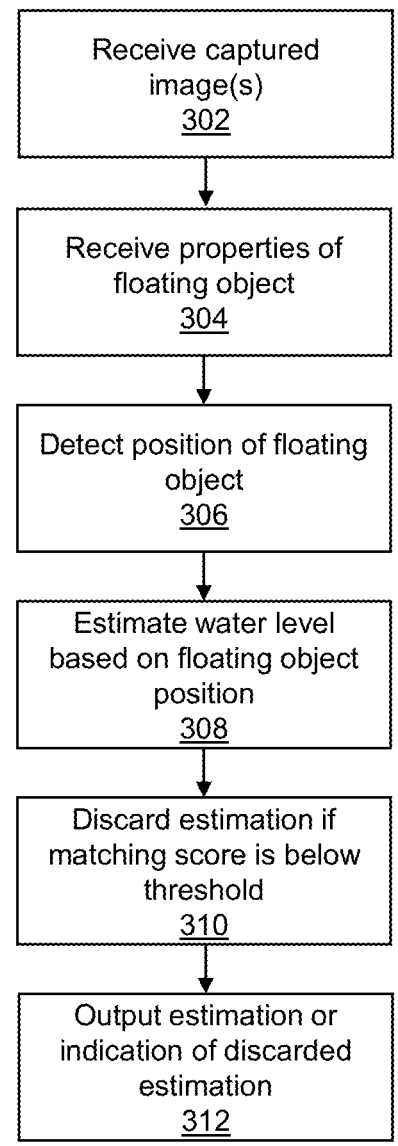
FIG. 3 illustrates a flow diagram of a method for automated water operations for aquatic facilities, according to an embodiment.

FIG. 3 illustrates a method for automated water level estimation of aquatic facilities 300, in accordance with an embodiment.

At block 302, the input module 170 receives one or more captured images from the one or more cameras 170. The one or more captured images each capturing at least a portion of the aquatic facilities; such that the combination of the captured images covers approximately the totality of the aquatic facilities. In some cases, being the same captured images of method 200 and/or method 400.

The floating object is regulated to move only up and down inside the water, and its location indicates the water level inside the swimming pool. The camera must be positioned such that the floating object is visible for its entire range of movement. The hole inside the floating object must be wider than the rail, such that it never sticks to the rail even though water level is lower than the floating object.

At block 304, the input module 170 receives, from a user or technician via the user interface 156, approximate shape, color, and in some cases, possible locations of the floating object. The possible locations of the floating object can be defined using a graphical user interface by the user, for example, during installation. In some cases, the user can draw an object specifying two lateral end-points of possible vertical movement of the floating object (for example, the top point and bottom point on the rail). For each end-point, the user can input a corresponding water level. In some cases, the user can select the color and/or shape of the floating object from a captured image of the camera 190.

At block 306, the object detection module 180 detects a position of the floating object in the water in the aquatic facilities by using the captured images in a template matching approach. In some cases, the object detection module 180 can use the template matching approach along the pre-defined line for estimating the water level. The shape and color of the floating object can be used as a template model for the object detection module 180 to use template matching to detect the location of the floating object. In some cases, the water level machine learning model can output a matching score along with an estimated position of the floating object.

At block 308, in some cases, the object detection module 180 can discard the estimation if the associated matching score is lower than a predetermined threshold. If the template matching score is lower than the predetermined threshold, it likely indicates that the floating object is occluded by something. In most cases, the predetermined threshold can be empirically selected to minimize false positive detections.

At block 310, the level estimation module 182 estimates a water level by projecting the detected location of the floating object into a water level measurement. In some cases, the level estimation module 182 can use regression of the location of the floating object over the defined line. The normalized location of the detected floating object between the two end-points is used to estimate the water level. In an example, one of the end-points specifies the top part of the rail ($P_{top}$) in which the floating point is moving inside, and the other end-point specifies the bottom of the rail ($P_{bottom}$). For each of the end-points, a corresponding water level is specified, as $L_{top}$ and $L_{bottom}$ respectively. The mass center of the detected floating object ($P_m$) is located, and the following can be used to estimate the water level ($L_{water}$):

$$\alpha : \min_\alpha |P_m - ((1-\alpha) \cdot P_{top} + (\alpha \cdot P_{bottom}))|$$

$$L_{water} = (1-\alpha) \cdot L_{top} + \alpha \cdot L_{bottom}$$

At block 312, the water level estimation is outputted by the output module 188; for example, to the database 166, to other modules, to the user interface 156, or to the network interface 160.

In some cases, water level measurement, as practiced in method 300, can be repeated periodically. In many cases, there is no need for frequent repetition of the water level estimation. In an example, the method 300 can be repeated a few times every second to update the water level estimation. In some cases, such periodicity can ensure that the water waves made by swimmers generally do not affect the water level estimation.

In some cases, the occupant detection module 174 and/or the classification module 176 can provide input to the object detection module 180 to pause floating object detection when an occupant is obstructing, or close to obstructing, the defined line for floating object detection. This pausing can increase reliability of the estimation of water level.

In some cases, more than one floating object can be located in the water to provide redundancy in case one or more of the floating objects are obstructed or not useable for estimation of water level.

As another aspect of the present disclosure, turbidity can be estimated using images captured by the one or more cameras 190. Water, such as the water located in a swimming pool, can sometimes appear cloudy; which is known as turbidity. Causes of turbidity can include, for example: bacterial growth, failed circulation pump, excessive air in the water, localised areas of high pH, powered chemicals not dissolved properly before addition to the pool, incompatible cleaning materials, excessive water hardness, inadequate filtration, and the like. Turbid water can cause health problems for occupants. Therefore, repeated accurate measurement of the turbidity level of water can be very important.

Figure 8:
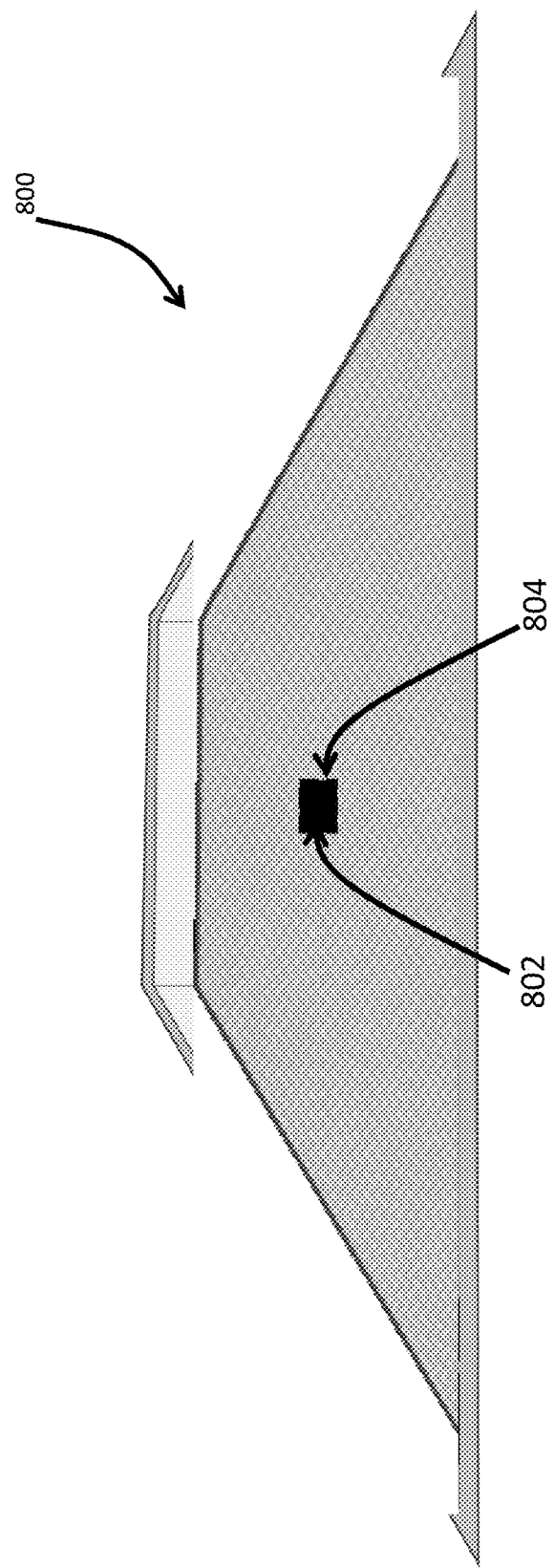
FIG. 8 illustrates an example of a swimming pool having a turbidity indicator for estimating turbidity of the water, in accordance with the system of FIG. 1.

Embodiments of the present disclosure can automatically determine a level of turbidity using a proportional relationship of turbidity with an ability to see through the water clearly. The present inventors determined that a relationship exists between turbidity and image quality of captured images of the water. The image quality determinants can include, for example, one or more of: contrast, sharpness, edge strength, and colorfulness. Measuring the image quality can thus provide a significant estimation of the turbidity. FIG. 8 illustrates an example of a swimming pool 800 having a turbidity indicator 802 for estimating turbidity of the water. In this case, the turbidity indicator is a black disk painted on the floor of the pool 800. In further cases, the turbidity indicator can be any suitable object, painting, or marking, sufficiently submerged in the water, and positioned and colored to be visible by the camera 190. In this example, the turbidity indicator 802 in located within the region of interest 804.

Figure 4:
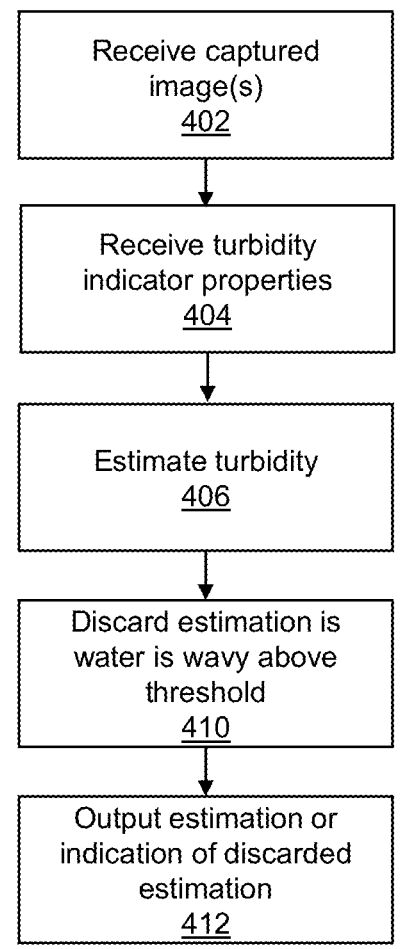
FIG. 4 illustrates a flow diagram of a method for automated water operations for aquatic facilities, according to an embodiment.

FIG. 4 illustrates a method for automated turbidity estimation of aquatic facilities 400, in accordance with an embodiment.

At block 402, the input module 170 receives one or more captured images from the one or more cameras 170 capturing the turbidity indicator. The one or more captured images each capturing at least a portion of the aquatic facilities; such that the combination of the captured images covers approximately the totality of the aquatic facilities. In some cases, being the same captured images of method 200 and/or method 300.

At block 404, the turbidity module 184 feeds the one or more captured images to a turbidity machine learning model to estimate the turbidity of the water based on clarity of the turbidity indicator. In some cases, the turbidity machine learning model can use the same architecture as the determination machine learning model except outputting a turbidity level as a float value. In such cases, the turbidity machine learning model can use a computer vision model; for example, the turbidity machine learning model can include a regression model and use ResNet-50 to extract multi-resolution features and use a multi-layer perceptron (MLP) to map the extracted features to turbidity labels. In some cases, the turbidity machine learning model can be trained using images of the aquatic facilities without any occupants in the images (for example, a few hundred training images). Each of the training images capturing the water with a different image clarity of the turbidity indicator and thus a different value for turbidity. Each of these training images can be manually labelled with a value of turbidity as the ground truth label. In some cases, the turbidity module 184 can use an incremental learning approach to collect data in a semi-supervised manner and to adapt to new environments.

In some cases, the occupant detection module 174 and/or the classification module 176 can provide input to the turbidity module 184 to indicate frames containing no occupants to increase reliability of the estimation of turbidity.

At block 406, in some cases, the wave detection module 184 can use a wave detection machine learning model to classify whether the water in the captured images is wavy above a predetermined threshold. In some cases, the wave detection machine learning model can use the same architecture as the determination machine learning model except outputting either 0 for a determination of wavy or 1 for a determination of not wavy (or vice versa). If the water is determined to be wavy, the wave detection module 184 can indicate that the water is wavy and thus the turbidity measurement for the respective captured image should be discarded because the turbidity measure is not reliable. In some cases, the wave detection machine learning model can be trained using images of the aquatic facilities with different levels of waviness (for example, a few hundred training images). Each of the training images being previously manually labelled as either being wavy or not wavy. In further cases, a clustering approach can be used on unlabelled training images to determine whether each is capturing a wavy scene or not.

At block 408, the turbidity estimation is outputted by the output module 188; for example, to the database 166, to other modules, to the user interface 156, or to the network interface 160.

Aspects of the present disclosure also provide an approach to modulating a volume of water flowing into and draining out of the aquatic facilities. In most cases, the water control module 186 regulates that a predetermined volume of water ($V_{hc}$), for example as defined by a relevant health and safety code, is added per occupant entering the water. In most cases, the water control module 186 also regulates that the water level is within a pre-defined range.

Figure 5:
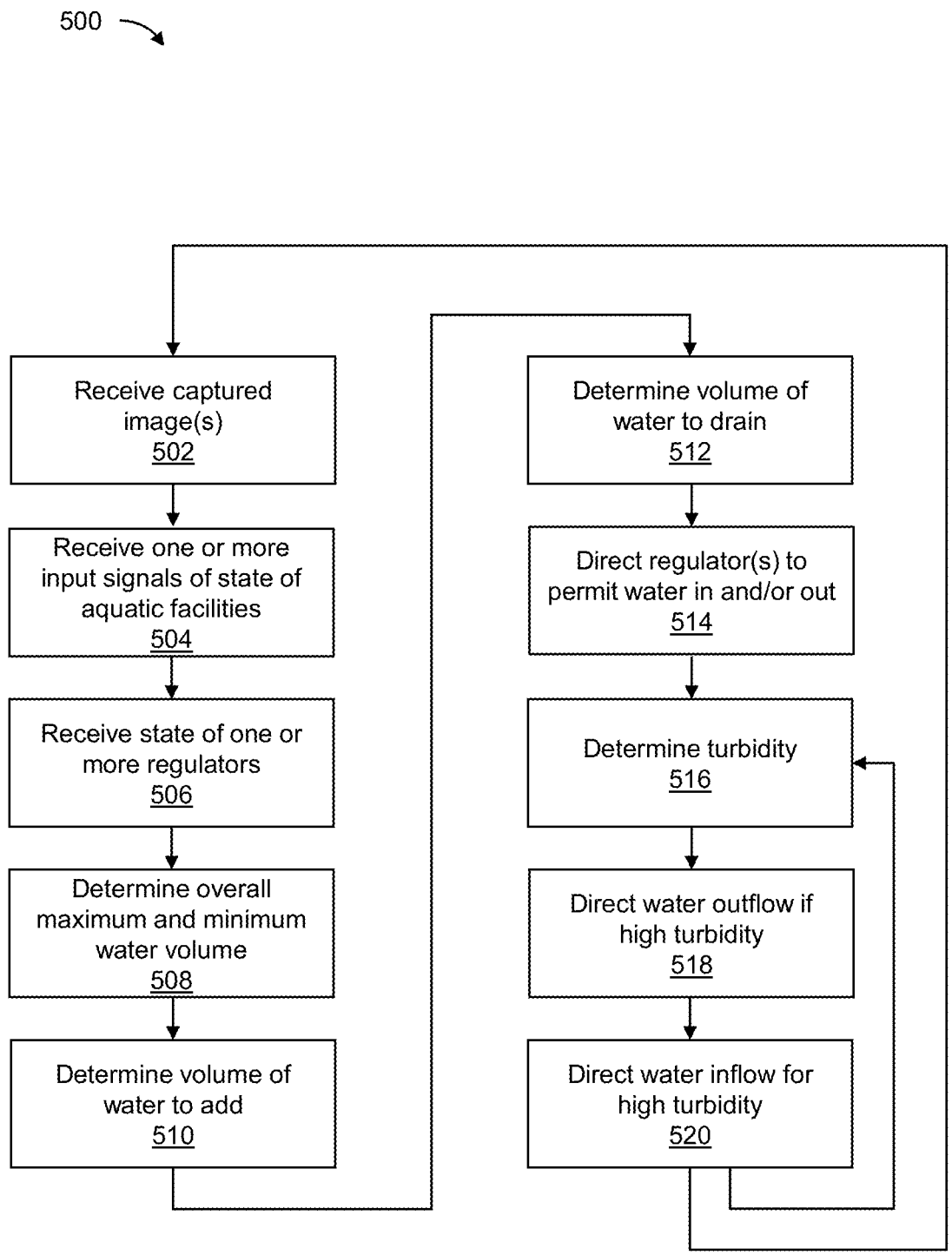
FIG. 5 illustrates a flow diagram of a method for automated water operations for aquatic facilities, according to an embodiment.

FIG. 5 illustrates a method for automated water operations for aquatic facilities 500, in accordance with an embodiment.

At block 502, the input module 170 receives one or more captured images from the one or more cameras 170. The one or more captured images each capturing at least a portion of the aquatic facilities; such that the combination of the captured images covers approximately the totality of the aquatic facilities.

At block 504, the water control module 186 receives input signals each comprising a state of the aquatic facilities and based on information determined from the captured images. The input signals can include:
- the number of occupants in the water, as determined by the counting module 178, for example as described in method 200—the count of swimmers is referred to as $C_{SW}$; and
- the water level, as estimated by the level estimation module 182, for example as described in method 300. In further cases, the water level can be determined using a suitable water level sensor; for example, hydrostatic pressure level sensors, ultrasonic level sensors, capacitance level sensors, radar level sensors, and the like.

At block 506, the water control module 186 receives a state for each of the regulators 192 at the inlet and outlet. In some cases, where the regulator is a solenoid water valve, whether the respective valve is open and the water is flowing, or the valve is closed and the water is not flowing. In some cases, the state includes water flow readings at each of the regulators as determined by a water flow sensor.

At block 508, in some cases, the water control module 186 determines an overall maximum volume of water that can be added and an overall minimum volume of water to be added. The overall minimum volume of water ($V_{min}$) is determined based on the difference between the water level before the addition of any water ($L_{curr}$) and a minimum water level allowed ($L_{min}$). $L_{max}$, along with the area of the aquatic facilities ($L_{curr}$), can be inputted during installation or prior to operation. The minimum level of water ($V_{min}$) is determined as follows:

if $L_{min} > L_{curr}$ then $V_{min} = (L_{min} - L_{curr}) \times A$, otherwise $V_{min} = 0$.

The overall maximum volume of water ($V_{max}$) can be determined based on the difference between the water level before the addition of any water ($L_{curr}$) and the maximum water level allowed ($L_{max}$). $L_{max}$ can be inputted during installation or prior to operation. The maximum level of water ($V_{max}$) is determined as follows:

$V_{max} = (L_{max} - L_{curr}) \times A$

At block 510, the water control module 186 determines an approximate volume of water to add to the aquatic facilities ($V_{add}$) by multiplying the counted number of occupants ($C_{SW}$) by a predetermined volume of freshwater to add per occupant ($V_{hc}$); which can be summarized as:

$V_{add} = C_{SW} \times V_{hc}$

The required volume of freshwater to add per occupant ($V_{hc}$) is predetermined according to the relevant regulations or as generally dictated by good hygienic practice.

If $V_{add}$ is smaller than $V_{min}$, the water control module 186 can set $V_{add}$ equal to $V_{min}$, which ensures both the relevant regulations and the minimum water level requirements are satisfied.

At block 512, the water control module 186 determines an approximate volume of water to drain from the aquatic facilities ($V_{dr}$). If $V_{add}$ is greater than $V_{max}$, the difference is the volume of water which is to be drained out of the swimming pool ($V_{dr}$), which can be determined as follows:

$V_{dr} = V_{add} - V_{max}$

At block 514, the water control module 186 directs the regulator 192 controlling inflow freshwater to permit inflows of water approximately equal to the determined water addition volume $V_{add}$ and directs the regulator 192 controlling outflow water to permit outflows of water approximately equal to the determined water draining volume $V_{dr}$. In some cases, the regulator 192 has an associated freshwater pump to pump the determined water volume $V_{add}$ of freshwater into the aquatic facilities. In other cases, the regulator 192 does not include a water pump, and thus the water control module 186 directs a time that the valves of the regulator 192 are open without controlling water flow. In these cases, an average water flow rate can be measured at the regulator 192 and stored as a fixed value by the water control module 186. The water control module 186 can use the flow rate to determine the time needed to keep the valve open to add the determined water volume $V_{add}$ of freshwater or drain the determined water volume $V_{dr}$. Alternatively, a digital water flow meter can be used in association with the regulator 192 before an inlet solenoid valve to measure the volume of added water and close the valve when it reaches the determined water volume $V_{add}$ of freshwater or $V_{dr}$ of drained water.

At block 516, the turbidity module 184 can estimate the turbidity of the water, for example as described in method 400.

At block 518, the water control module 186 compares the turbidity to a predetermined threshold. If the turbidity is above the predetermined threshold, the water control module 186 directs the regulator 192 controlling outflow to drain a volume of water referred to as a turbidity drainage volume ($V_{drT}$), determined as:

$V_{drT} = (L_{curr} - L_{min}) \times A$

In some cases, turbidity can be determined as a floating point value between 0 to 1; where the closer to 1, the lower the quality of the water. In some cases, the predetermined turbidity threshold can be empirically selected. In an example, from experiments, 0.2 can be used for the turbidity threshold.

At block 520, and then, the water control module 186 directs the regulator 192 controlling outflow to stop outflow and then directs the regulator 192 controlling inflow to add water approximately equivalent to a volume of water referred to as a turbidity addition volume ($V_{addT}$), determined as:

$V_{addT} = (L_{max} - L_{min}) \times A$

In some cases, blocks 516 to 520 can be repeated until the turbidity is below the predetermined threshold value.

In some cases, blocks 502 to 520 can be repeated periodically; for example, at a scheduled time interval. In some cases, for each repetition, the counting module 178 resets the occupant count and determines the occupant count again.

In some cases, the system 150 can receive a confirmatory input from a user prior to initialization of the addition or drainage of water to ensure against malfunction. In some cases, the user can provide an emergency input to cease operation of the system 150 and close the valves of the regulators 192.

Figure 6:
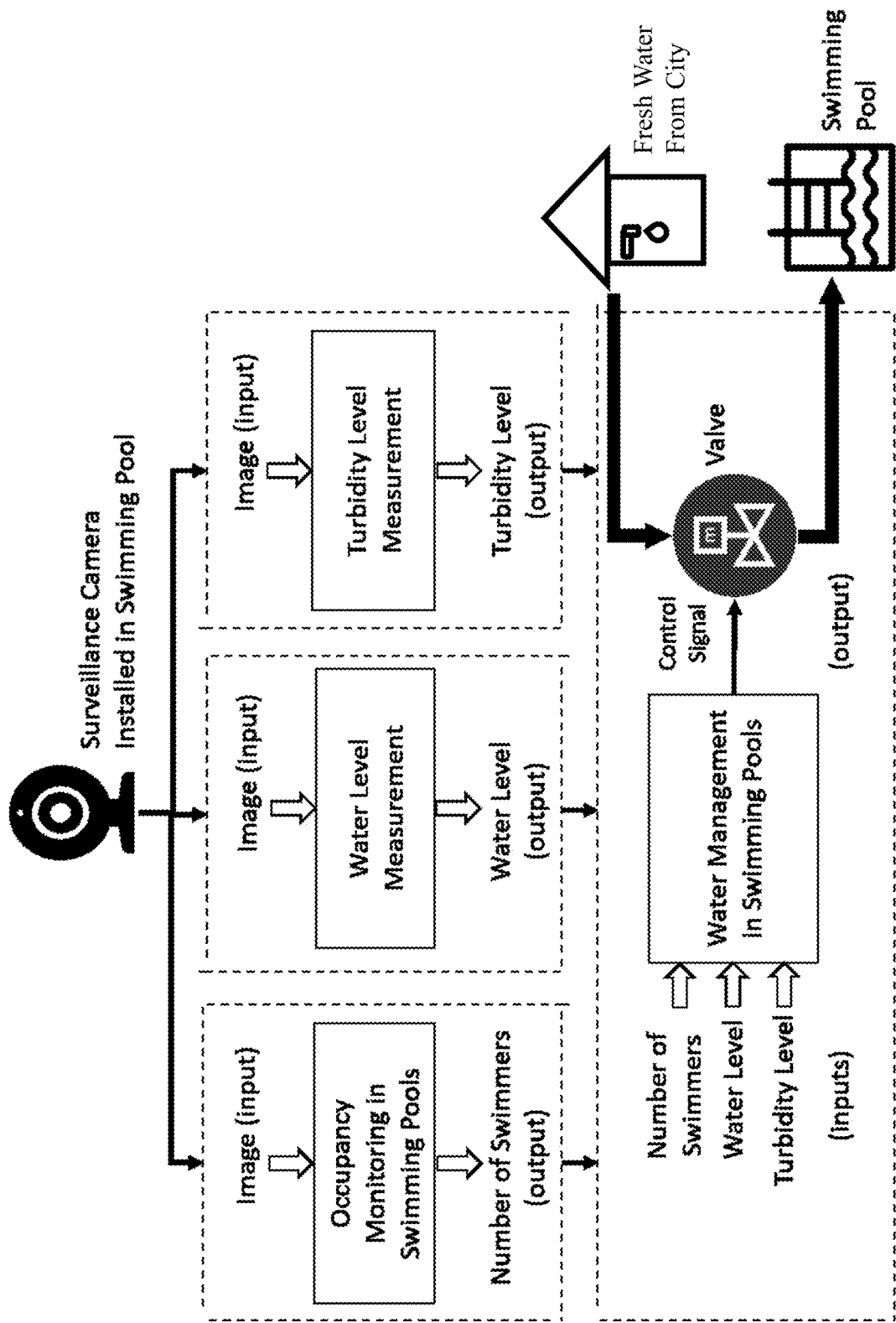
FIG. 6 illustrates a diagram of an example implementation of the system of FIG. 1 for a swimming pool.

FIG. 6 illustrates a diagram of an example implementation of the system 150 for a swimming pool.

Although the foregoing has been described with reference to certain specific embodiments, various modifications thereto will be apparent to those skilled in the art without departing from the spirit and scope of the invention as outlined in the appended claims. The entire disclosures of all references recited above are incorporated herein by reference.

The invention claimed is:

1. A computer-implemented method for automated water operations for aquatic facilities using at least one image captured of the aquatic facilities, the method comprising:
receiving the at least one captured image;
receiving an input signal comprising a detected number of occupants in the water at the aquatic facilities captured in the at least one captured image determined using a trained detection machine learning model, the detection machine learning model taking as input the at least one captured image with an associated feature map, and outputting a detection of each occupant in the water, the detection machine learning model trained using training images, each training image comprising a respective label for each occupant in such training image;
determining a volume of water to add by multiplying the number of occupants detected by the trained machine learning model by a predetermined volume of freshwater to add per occupant; and
directing one or more water flow regulators to control inflow of water equivalent to the volume of water to add.

2. The method of claim 1, further comprising receiving another input signal comprising a water level estimation.

3. The method of claim 2, wherein the water level is estimated using a trained water level estimation machine learning model, the water level estimation machine learning model receiving the at least one captured image as input, the at least one captured image capturing a floating object indicative of the water level, the water level estimation machine learning model outputting the water level based on detection of the vertical position of the floating object, the water level estimation machine learning model trained using training images each comprising the floating object and a respective label for water level.

4. The method of claim 2, further comprising determining a maximum volume of water that can be added and determining a minimum volume of water to be added, the minimum volume of water to add is determined using the difference between the water level before the addition of any water and a minimum permitted water level multiplied by the area of the water, the maximum volume of water to add is determined using the difference between the water level before the addition of any water and a maximum permitted water level multiplied by the area of the water.

5. The method of claim 4, wherein where the volume of water to add is less than the minimum volume of water to add, the volume of water to add is made equal to the minimum volume of water to add.

6. The method of claim 4, further comprising determining a volume of water to drain when the volume of water to add is greater than the maximum volume of water to add, the volume of water to drain is determined as a difference between the volume of water to add and the maximum volume of water to add, and directing the one or more water flow regulators to control outflow of water equivalent to the volume of water to drain.

7. The method of claim 6, further comprising:
receiving a further input signal comprising an estimated turbidity of the water; and
where the turbidity is greater than a predetermined turbidity threshold, performing:
directing the one or more water flow regulators to control outflow of water equivalent to a turbidity volume of water; and
directing the one or more water flow regulators to control inflow of freshwater equivalent to the turbidity volume of water.

8. The method of claim 7, wherein the turbidity of the water is estimated using a trained turbidity machine learning model, the trained turbidity machine learning model receiving the captured image as input, the captured image comprising a turbidity indicator submerged in the water, the trained turbidity machine learning model outputting the turbidity of the water based on an image clarity of the turbidity indicator in the captured image indicative of the turbidity of the water, the turbidity machine learning model trained using training images each comprising the turbidity indicator and a respective label for turbidity.

9. The method of claim 1, wherein the associated feature map is localized and classified using a region proposal network.

10. The method of claim 1, wherein semi-supervised background subtraction is performed to remove areas not capturing water from the captured image that is inputted to the trained detection machine learning model.

11. A system for automated water operations for aquatic facilities using at least one image captured by one or more cameras of the aquatic facilities, the system in communication with one or more water flow regulators, the system comprising one or more processors and a data storage, the one or more processors configured to execute:
an input module to receive the at least one captured image from the one or more cameras;
a water control module to:
receive an input signal comprising a detected number of occupants in the water at the aquatic facilities captured in the at least one captured image determined using a trained detection machine learning model, the detection machine learning model taking as input the at least one captured image with an associated feature map, and outputting a detection of each occupant in the water, the detection machine learning model trained using training images, each training image comprising a respective label for each occupant in such training image; and
determine a volume of water to add by multiplying the number of occupants detected by the trained machine learning model by a predetermined volume of freshwater to add per occupant; and
a device interface to direct the one or more water flow regulators to control inflow of water equivalent to the volume of water to add.

12. The system of claim 11, wherein the input module further receives another input signal comprising a water level estimation.

13. The system of claim 12, wherein the water level is estimated using a trained water level estimation machine learning model, the water level estimation machine learning model receiving the at least one captured image as input, the at least one captured image capturing a floating object indicative of the water level, the water level estimation machine learning model outputting the water level based on detection of the vertical position of the floating object, the water level estimation machine learning model trained using training images each comprising the floating object and a respective label for water level.

14. The system of claim 12, wherein the water control module further determines a maximum volume of water that can be added and determining a minimum volume of water to be added, the minimum volume of water to add is determined using the difference between the water level before the addition of any water and a minimum permitted water level multiplied by the area of the water, the maximum volume of water to add is determined using the difference between the water level before the addition of any water and a maximum permitted water level multiplied by the area of the water.

15. The system of claim 14, wherein where the volume of water to add is less than the minimum volume of water to add, the volume of water to add is made equal to the minimum volume of water to add.

16. The system of claim 14, wherein the water control module further determines a volume of water to drain when the volume of water to add is greater than the maximum volume of water to add, the volume of water to drain is determined as a difference between the volume of water to add and the maximum volume of water to add, and wherein the device interface directs the one or more water flow regulators to control outflow of water equivalent to the volume of water to drain.

17. The system of claim 16, wherein the input module further receives a further input signal comprising an estimated turbidity of the water, and where the turbidity is greater than a predetermined turbidity threshold, the device interface directs the one or more water flow regulators to control outflow of water equivalent to a turbidity volume of water, and the device interface directs the one or more water flow regulators to control inflow of freshwater equivalent to the turbidity volume of water.

18. The system of claim 17, wherein the turbidity of the water is estimated using a trained turbidity machine learning model, the trained turbidity machine learning model receiving the captured image as input, the captured image comprising a turbidity indicator submerged in the water, the trained turbidity machine learning model outputting the turbidity of the water based on an image clarity of the turbidity indicator in the captured image indicative of the turbidity of the water, the turbidity machine learning model trained using training images each comprising the turbidity indicator and a respective label for turbidity.

19. The system of claim 11, wherein the associated feature map is localized and classified using a region proposal network.

20. The system of claim 11, wherein semi-supervised background subtraction is performed to remove areas not capturing water from the captured image that is inputted to the trained detection machine learning model.

* * * * *